United States Patent [19]

Beck

[11] Patent Number: 5,739,433

[45] Date of Patent: Apr. 14, 1998

[54] TOUCH OFF PROBE

[75] Inventor: Kenneth M. Beck, Kennewick, Wash.

[73] Assignee: University of Central Florida, Orlando, Fla.

[21] Appl. No.: 632,660

[22] Filed: Apr. 15, 1996

[51] Int. Cl.$^6$ .............................. G01H 17/00; B24B 49/10
[52] U.S. Cl. ............................ 73/660; 340/680; 409/186
[58] Field of Search ........................... 73/660, 643, 584; 451/10, 11; 340/680; 409/186, 196

[56] References Cited

U.S. PATENT DOCUMENTS

| | | | |
|---|---|---|---|
| 3,713,127 | 1/1973 | Keledy et al. | 340/261 |
| 4,011,472 | 3/1977 | Feng | 310/8.1 |
| 4,144,767 | 3/1979 | Kaule et al. | 73/643 |
| 4,563,897 | 1/1986 | Moore | 73/587 |
| 4,574,633 | 3/1986 | Ohnuki et al. | 73/587 |
| 4,636,780 | 1/1987 | Thomas et al. | 340/680 |
| 4,893,742 | 1/1990 | Bullock | 228/110 |
| 4,922,754 | 5/1990 | Horne et al. | 73/587 |
| 5,196,006 | 3/1993 | Klopotek et al. | 606/12 |
| 5,218,258 | 6/1993 | Shirasu et al. | 310/323 |
| 5,414,510 | 5/1995 | Schultz et al. | 356/349 |
| 5,418,804 | 5/1995 | Zhiglinsky et al. | 372/69 |

OTHER PUBLICATIONS

Webster et al., "Acoustic Emission for Process Control and Monitoring of Surface Integrity during Grinding", Annals of the CIRP, vol. 43, Jan. 15, 1994, pp. 299–304.

Jenab et al., "An Active Vibration Cancellation Strategy for the OPTICAM SX", Center for Optics Manufacturing, Univ. Rochester, presented at OPTIFAB '94, Oct. 17, 1994, pp. 2–24.

*Primary Examiner*—John E. Chapman
*Attorney, Agent, or Firm*—Brian S. Steinberger; Law Offices of Brian S. Steinberger

[57] ABSTRACT

In a first preferred embodiment a transmitting acoustic transducer mounted on the tool axis or spindle of a grinding tool affords a method for pre-contact recognition and control (touch-off) independent of tool grit, workpiece material, and all natural machining frequencies. The transmitting transducer such as a piezoelectric polymer or crystal generates a selected frequency of approximately 1–5 MHz. As the tool enters a lubricating plume surrounding the workpiece, the ultrasonic transmission couples through the fluid interface to the workpiece. A receiving transducer mounted on the optical workpiece gives a unequivocal and rapid detection of the transmission by a highly filtered(band pass) receiving transducer before the tool contacts the workpiece. In a second preferred embodiment, a photoacoustic laser excites a modulated frequency to the grinding tool and to the receiving transducer. Alternatively, the resonant frequency (approximately 300 KHz) of the grinding tool can be detected by the receiving transducer.

5 Claims, 3 Drawing Sheets

TOUCH OFF PROBE

This invention relates to probe sensing apparatus, and in particular to a method and apparatus for detecting pre-contact between a grinding tool such as a laser, and an optics workpiece using acoustical emission and detection. This invention claims priority to a provisional application entitled: Touch Off Probe, Provisional application No.60/012688 filed on Mar. 1, 1996.

BACKGROUND AND PRIOR ART

The high precision microscale grinding of optical materials can require various tools, tool speeds and tool alignment maneuvers for the successful finishing of a single optical workpiece. Currently much time and skill is needed by the worker in order to manually center and align the grinding tool with the piece to be worked on. Generally, a user must start and stop the grinding tool before and/or after the grinding tool is to be operated. Presently, there exists no practical and automatic method and system for determining when the approaching tool is immediately adjacent but not touching the workpiece.

Currently, ultrasonic detection of imperfections and cracks in various refractory metals and alloys utilizing transducers has been used as a quality control process. Furthermore, the recent use of the root mean square of acoustic emission for the detection of tool contact and exit has been commercially developed by several companies. See "Acoustic Emission for Process Control and Monitoring of Surface Integrity during Grinding", J. Webster, I. Marinescu, R. Bennet, R. Linsay (Univ. Conn.), CIRP Congress, Singapore, 1994.

Additionally, various filtering techniques have found some utility in the laboratory for diagnosing "impulsive noise" or spikiness from abrupt changes in the tool and workpiece holder (bool) interface (i.e., kurtosis and remainder least squares methods). It has been noted that the waveform recorded from fast response transducers is both a characteristic of the material tested and the stress it is suffering. Since the grinding zone is not constant and moves relative to the workpiece holder (bool), the signal measured will vary in amplitude. Recent studies on OPTICAM SM by Don Golini (COM) have determined that the three primary types of lens error are caused by three mechanisms. See "An Active Vibration Cancellation Strategy for the OPTICAM SX", A. Jenab and A. Reimers(Metron, Inc.), OPTIFAB, Rochester, 1994. In all previous approaches to acoustic detection, the signal amplitude is detected and analyzed.

Several U.S. patents fail to simply and economically overcome the problems addressed above. U.S. Pat. No. 5,285,397 to Heier et al. describes an expensive, elaborate, and complex multiple video camera system for non-contact measurement of objects in a workplace. U.S. Pat. Nos.: 3,713,127 to Keledy et al.; 4,011,472 to Feng; 4,144,767 to Kaule et al.; 4,563,897 to Moore; 4,574,633 to Ohnuki et al.; 4,636,780 to Thomas et al.; 4,893,742 to Bullock; 4,922,754 to Horne et al.; 5,414,510 to Schultz et al.; 5,418,804 to Zhiglinsky et al.; 5,196,006 to Klopotek et al.; 5,218,258 to Shirasu et al. cite other art that also do not overcome the above cited problems.

SUMMARY OF THE INVENTION

The first objective of the present invention is to provide for the direct, time resolved sensing of a cutting tool such as but limited to a grinding tool, that is approaching an optical workpiece.

The second object of this invention is to provide a system for coupling acoustic waves from a photo-acoustically-excited tool through a lubricating plume that normally is shrouding a workpiece during grinding operations.

The third object of this invention is to provide a method of photoacoustic laser excitation of a tool axis or spindle which affords a method for pre-contact recognition and control (touch-off) independent of tool grit, workpiece material, and all natural machining frequencies.

The fourth object of this invention is to provide a transmitting acoustic transducer mounted on the tool axis or spindle which affords a method for pre-contact recognition and control (touch-off) independent of tool grit, workpiece material, and all natural machining frequencies.

In a preferred embodiment, laser light generates a specific frequency by means of photoacoustics in the optical grinding tool which is coupled by linear acoustic waves (travelling at the speed of sound) through a lubricating fluid to the workpiece where a transducer can detect that specific frequency eliminating all noise interferences from the grinding process. The detection can be used to both control and position the grinding tool during the grinding process. The invention directs linear acoustic waves using a unique frequency of approximately 1-5 MHz that is generated by modulating a single laser beam or by exciting the natural or resonant frequency of the optical grinding tool. No exterior generated modulating of the workpiece occurs. The photo-acoustically-excited tool couples acoustic waves through a lubricating plume that is shrouding a workpiece during grinding operations. If the tool is too high above the workpiece(outside of the lubricating plume), no signal will be transmitted to the workpiece.

In a second preferred embodiment, a transmitting acoustic transducer mounted on the tool axis or spindle generates a unique frequency of approximately 1-5 MHz to a matching transducer on the workpiece. The second embodiment also allows for pre-contact recognition and control (touch-off) independent of tool grit, workpiece material, and all natural machining frequencies. An alterative version of the second embodiment has the receiving transducer detect the resonant frequency, approximately 300 KHz generated by the grinding tool.

High frequency errors (surface microstructures, microroughness, and subsurface damage) are dependent on the glass used, the infeed rate and the grinding diamond size. Mid-frequency errors (cutter marks) are caused by vibrations of the grinding machinery. Low-frequency errors (figure error and radius of curvature error) are caused by static alignment errors between axes of the tool and the bool.

In signal amplitude methods, the source of various signal inputs cannot be obtained. Nor can the varying effective sensitivities of the acoustic transducers be guaranteed to give a "true" acoustic emission profile. See "An Active Vibration Cancellation Strategy for the OPTICAM SX", A. Jenab and A. Reimers(Metron, Inc.), OPTIFAB, Rochester, 1994. Tonal "noise" from moving components and detection systems must be filtered using some form of bandpass network. This reduction in "noise" to enhance the signal-to-noise ratio also results in a dramatic reduction of "natural frequency" components which harbor the grinding vibrational information. Fast fourier-transformed (FFT) signal processing for use in both manufacturing control and quality assurance have been used in various field of research and electronics manufacturing for years. By applying FFT techniques to unfiltered acoustic emission, a time-resolved acoustic profile of all sources of vibration can be obtained.

The "natural frequencies" of the grinding machine (spindle vibration, pumps, fans, etc.) can be subtracted from an FFT profile. Deconvolution of the FFT profile back into an amplitude signal—minus grinding machine "natural frequencies"—can center attention on the acoustic signal arising solely from the tool/bool interface. The FFT technique lends itself to use in active control strategies for minimizing grinding machine vibrations. Specifically, this active control could come not by monitoring the vibrational modes of the grinding spindle, etc., but by detecting variations in the time-resolved, acoustic emission from the tool/bool interface alone.

When this FFT technique is coupled with a transmitting acoustic transducer mounted on the tool axis, a method is available for pre-contact recognition and control. By having the transducer transmit ultrasound at a specific frequency—chosen to be distinct from other acoustic emissions—the FFT detection system will be able to lock-in and recognize the grinding tool as it approaches the workpiece. After an initial presetting of the tool position with reference to the workpiece, a very rapid slew rate of tool entry—up to the point of contact—can be maintained.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

FIRST PREFERRED EMBODIMENT

Figure 1:
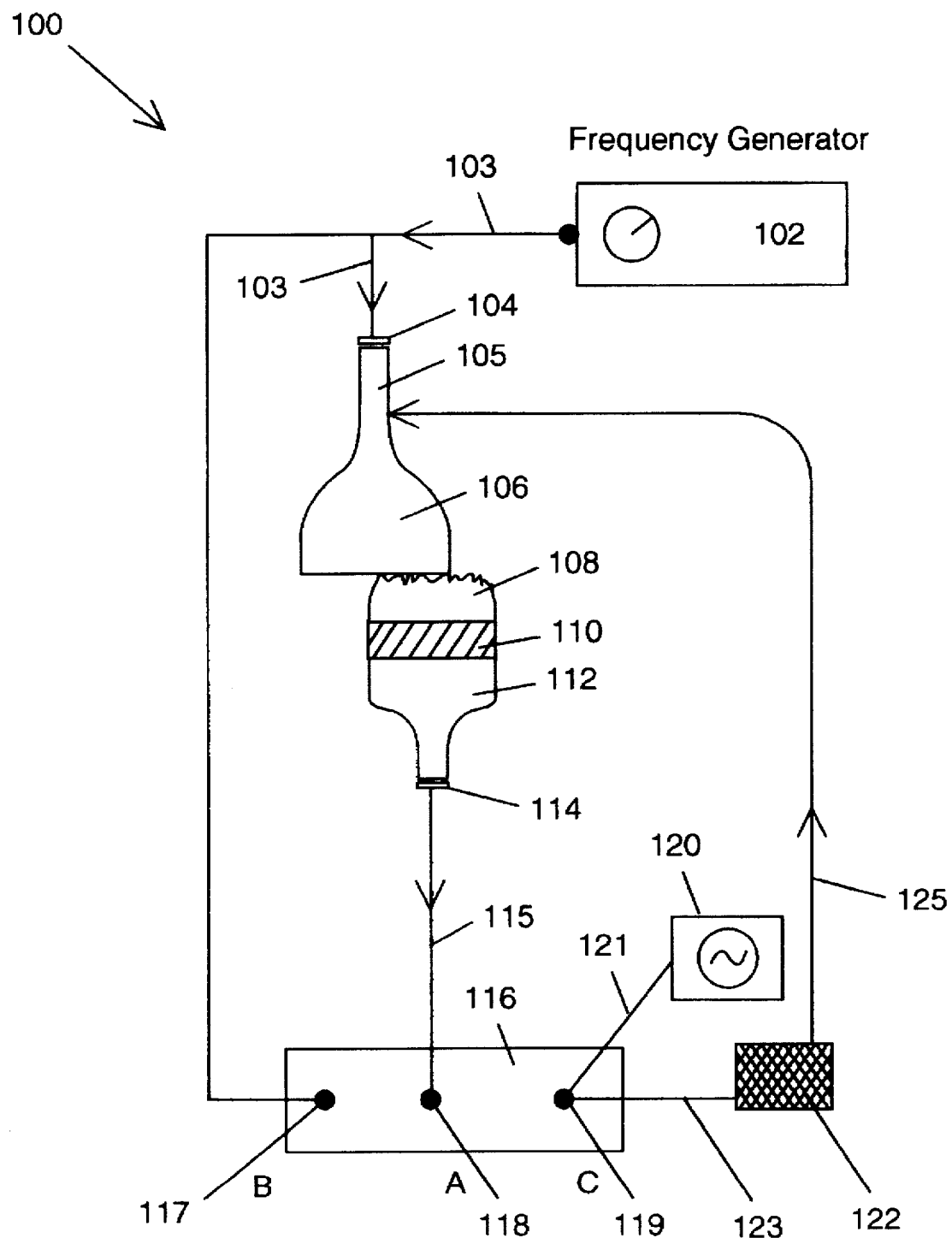
FIG. 1 is a first preferred embodiment of using a frequency generator to excite a transmitting transducer located on the grinding tool and detecting with a receiving transducer on the workpiece.

FIG. 1 is a first preferred embodiment 100 of using a frequency generator 102 to excite a transmitting transducer 104 located on the grinding tool 106 and detecting with a receiving transducer 114 on the workpiece 110. Frequency generator 102 such as Stanford Research Systems SR5 DS345 30 MHz. synthesized function generator generates up to approximately 20 MHz. A piezo electric transmitting transducer 104 and receiving transducer 114 have a selected bandwidth frequency of approximately 5 MHz. Piezoelectric transducers 104 and 114 can be pin transducers such as an approximately 1 mm diameter crystal or a piezoelectric polymer. A crystal pin transducer 104 can have high saturation pressure in excess of 2 kbar, with curie points greater than 145 Degrees Centigrade and mechanical Q greater than 1200. Using a polymeric transducer 104 can have the widest frequency range, maintaining a flat response from D.C. to 5 MHz (−3 dB). The pin transducer has at least two primary benefits in the subject invention. First, the speed of detection is limited by the speed of sound in the material. Second, the frequency response of the transducer determines the resolution of the acoustic waveform and therefore its unique characterization. The wider the frequency response, the higher the resolution and the more precisely the nature of material stress can then be interpreted.

The remaining components of FIG. 1 will now be described. Grinding tool 106 is a 50 mm diameter(diamond grit) optics grinding tool. Lubricating plume 108 is a sprayed lubricant such as "Challenge 300." Workpiece 110 is an optical workpiece such as optical glass, or BK-7 optical glass or "suprasil" synthetic quartz. Workpiece spindle or holder 112 is a "BB" spindle and ISO-30 tool holder. Lock-in amplifier and phase-locked loop circuitry 116 is an HR-8 manufactured by Princeton Applied Research. The Oscilloscope 120 is a Tektronix 2440(500 MHz). The detector and machine control circuitry 122 is a grinding system manufactured by the OPTICAM SX system.

Referring to FIG. 1, a selected frequency such as approximately 1–5 MHz is chosen with the frequency generator 102. The output of the frequency generator 102 goes to the transmitting transducer 104 through line 103 and to the REFERENCE INPUT (B') 117 of the lock-in amplifier 116. Transmitting transducer 104 is "potted" to the grinding tool 106 and can be fitted with a rotatable connector 105 (such as a mercury switch). The signal is then coupled to the grinding tool through line 103.

Referring to FIG. 1, before contact between the grinding tool 106 and the lubricant 108 covering the workpiece 110, no signal is detected by the receiving transducer 114. As the grinding tool 106 enters the lubricant 108, the acoustic signal generated 103 at the specific frequency chosen with the frequency generator 102 is coupled through the lubricant 108 to the workpiece 110 along with all other acoustic "noise" associated with the grinding process. From the work piece 110 the signal is coupled to the workpiece spindle 112. "Potted" to the workpiece spindle 112 is the receiving transducer 114.

Referring again to FIG. 1, the receiving transducer 114 is connected to the SIGNAL INPUT (A) 118 of the lock-in amplifier 116. The signal is amplified and compared to the specific frequency chosen with the frequency generator 102 at the REFERENCE INPUT (B') 117. Upon contact between the grinding tool 106 and the lubricant 108 a signal is generated at the OUTPUT (C) 119 of the lock-in amplifier which can be viewed on an oscilloscope 120 and sent to a detector and machine control circuitry 122 to interactively control and monitor through line 125 the grinding process (i.e., to slow down or stop the grinding tool infeed rate). At a given frequency of approximately 1.2 MHz, the speed of detection depends on the speed of sound in the lubricant(i.e. 90% H20 and glass), the detection occurs at a lubricant thickness of approximately 1 to approximately 2.0 mm.

As an example, the speed of a plane longitudinal sound wave in fused silica(as the lubricant) is approximately 5968 meters per second or 5.968 milimeters per microsecond. In a 25.4 mm thick bool, tool contact can be acoustically detected within approximately 4.3 microseconds. Assuming a bool of diameter 40 mm and a relative grinding rate of approximately 25,000 rpm, this means tool travel across the fused silica bool circumference would be only 220 microns before tool contact was detected, interpreted, and adjustments made to ramp rate or tool speed. Utilizing a heavy silica glass as the lubricant having a slower speed of sound such as 3980meters per second, tool travel would be proportionally longer at approximately 334.4 microns before contact of the tool is detected.

SECOND PREFERRED EMBODIMENT

Figure 2A:
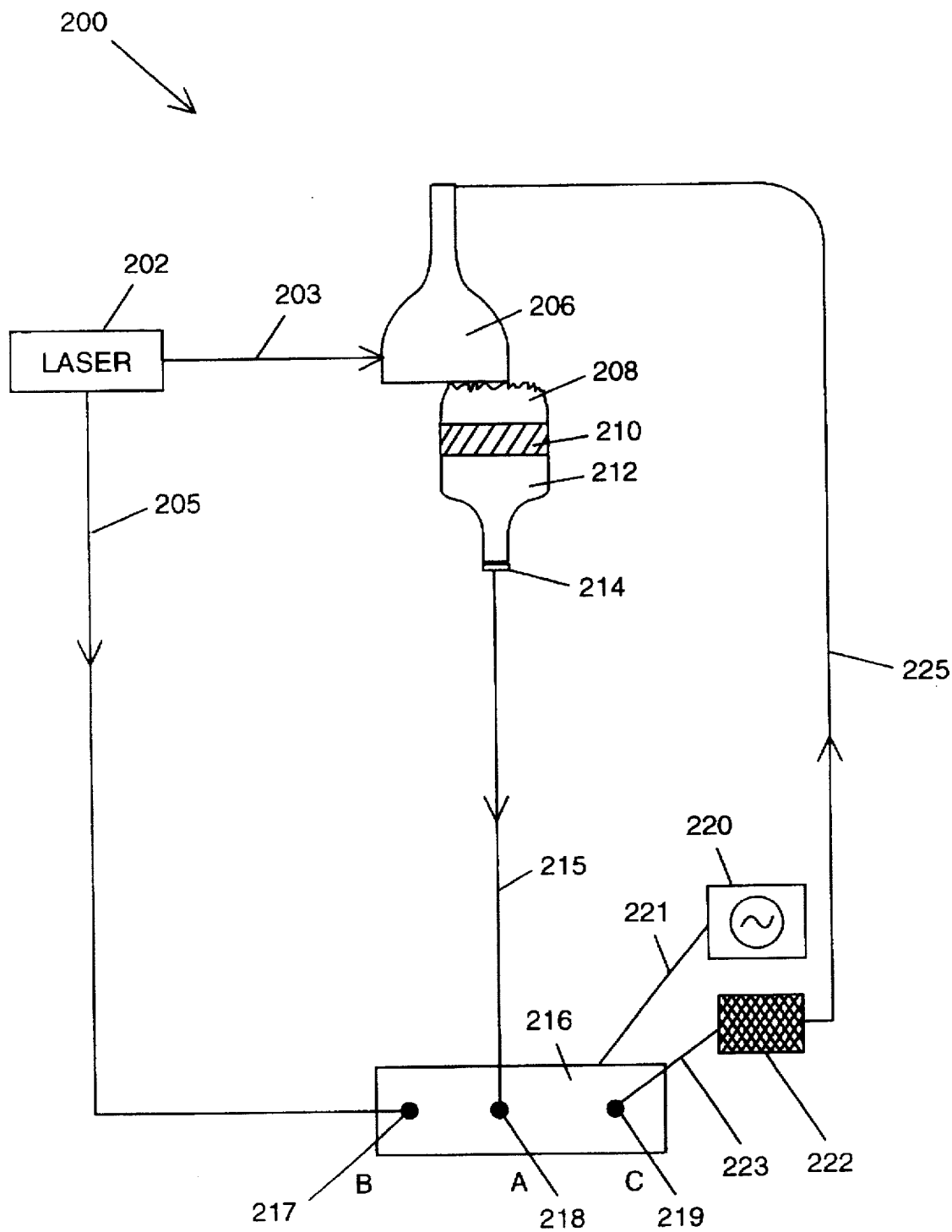
FIG. 2A is a second preferred embodiment of using a modulated laser to generate an acoustic frequency to the grinding tool and detecting the modulated frequency in an acoustic transducer attached to the workpiece spindle.
Figure 2B:
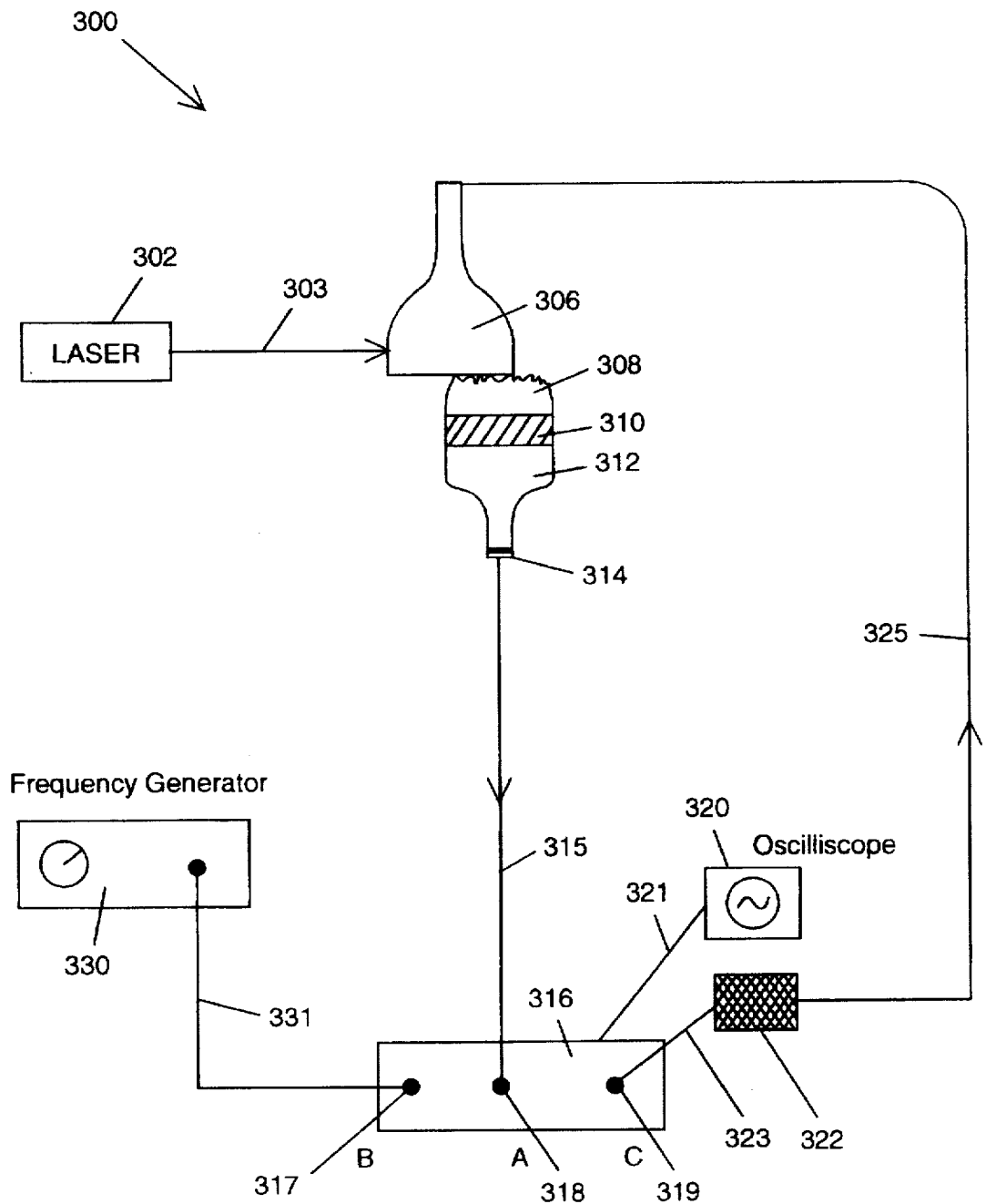
FIG. 2B is another second preferred embodiment of using a pulsed unmodulated laser wherein natural frequencies of the grinding tool are detected by the receiving transducer on the workpiece.

In both FIGS. 2A–2B, a laser generates an acoustic signal in a grinding tool instead of being generated by a transmitting transducer. The acoustic signal in FIGS. 2A–2B is generated photoacoustically, when the laser impinges on the grinding tool, causing phonon excitation that leads to acoustic generation both at the surface longitudinally across the optic workpiece and laterally through the bulk of the optic workpiece.

FIG. 2A is a second preferred embodiment 200 of using a modulated laser 202 to generate an acoustic frequency of approximately 1–5 MHz to the grinding tool 206 and detecting the modulated frequency in an acoustic receiving transducer 214 attached to the workpiece spindle 212. The modulated laser 202 can be a laser such as but not limited to a CO2 laser, a Nd:YAG laser or a laser diode. In FIG. 2A, a modulated laser beam 203 impinges on the grinding tool 206. The modulation frequency of the laser 202 is directed by line 205 to the REFERENCE INPUT(B) 217 of the lock-in amplifier 216. All the other components 208, 210, 212, 214, 215,219–223, 225 function similarly to like components 108, 110, 112, 114, 115, 119–123, and 125 of FIG. 1.

FIG. 2B is another second preferred embodiment 300 of using a pulsed unmodulated laser 302 wherein natural frequencies of the grinding tool are detected by the receiving transducer on the workpiece. The pulsed unmodulated laser 302 can be a laser such as but not limited to a CO2 laser, a Nd:YAG laser or a laser diode.

Referring to FIG. 2B, a pulsed and unmodulated laser beam 303 impinges on the grinding tool 306, exciting its "natural" or "resonant" frequency(approximately 300 KHz). A frequency generator 330 can be tuned to the resonant frequency having an output 331 connected to the REFERENCE INPUT(B') 317 of the lock-in amplifier 316. All other components 308, 310, 312, 314, 315, 318, 319–323 and 325 functionally correspond to like components of FIGS. 1 and 2A.

As an example, the speed of a plane longitudinal sound wave in fused silica(as the lubricant) is 5968 meters per second or 5.968 mm per microsecond. In a 25.4 mm thick bool-to-tool contact can be acoustically detected within 4.3 microseconds. Assuming a bool of diameter 40 mm and a relative grinding rate of 25,000 rpm, a tool travel across the fused silica bool circumference would be only 220 microns before tool contact was detected, interpreted, and adjustments made to ramp rate or tool speed. Substituting a heavy silicate glass at the interface where the speed of sound is slower (3980 m/s) tool travel would be proportionally longer (334.4 microns) before contact was detected.

Although a preferred embodiment describes monitoring a grinding tool, the invention can have applicability to other types of grinding tools such as but not limited to machine tools, milling machines and drills.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A system for pre-contact recognition and control (touch-off) of a controlled grinding tool approaching a workpiece which is independent of tool grit, workpiece material, and all natural machining frequencies, comprising:

a laser for generating a selected modulated ultrasonic frequency to a grinding tool; and a receiving transducer attached to a workpiece, wherein the generated selected modulated ultrasonic frequency is detected by the receiving transducer when the grinding tool enters a lubrication medium about the workpiece.

2. The system for pre-contact recognition of claim 1, wherein the selected modulated frequency includes:

approximately 1–5 MHz.

3. A system for pre-contact recognition and control (touch-off) of a grinding tool approaching a workpiece which is independent of tool grit, workpiece material, and all natural machining frequencies, comprising:

a laser for generating a pulsed unmodulated frequency beam to a grinding tool; and a receiving transducer attached to a workpiece, wherein a resonant frequency of the grinding tool is detected by the receiving transducer when the grinding tool enters a lubrication medium about the workpiece.

4. The system for pre-contact recognition of claim 3, wherein the resonant frequency includes:

approximately 300 KHz.

5. The system for pre-contact recognition of claim 3, wherein the means for generating the unmodulated laser beam includes a laser source selected from one of:

a CO2 laser, a Nd:YAG laser and a laser diode.

\* \* \* \* \*